US006307578B1

(12) United States Patent
Castelli

(10) Patent No.: US 6,307,578 B1
(45) Date of Patent: Oct. 23, 2001

(54) PRINTER COLOR REGISTRATION BY COMPENSATION FOR ECCENTRICITY IN IDLER ROLL

(75) Inventor: Vittorio Castelli, Yorktown Heights, NY (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/451,727

(22) Filed: Dec. 1, 1999

(51) Int. Cl.[7] .......................... G01D 15/06; G03G 15/01

(52) U.S. Cl. .............................................................. 347/116

(58) Field of Search .................................... 399/162, 167, 399/38, 223, 231, 163, 165, 301, 51, 178; 347/116–118

(56) References Cited

U.S. PATENT DOCUMENTS 5,075,702 * 12/1991 Castelli et al. ...................... 347/153
5,153,644 * 10/1992 Yang et al. ......................... 347/247
5,164,783 * 11/1992 Taguchi et al. ...................... 399/301
5,200,782 * 4/1993 Castelli et al. ...................... 399/165
5,200,791 * 4/1993 Dastin et al. ........................ 399/301
5,229,787 7/1993 Rees et al. ........................ 346/107 R
5,287,160 2/1994 Dastin et al. ...................... 355/326 R
5,287,162 2/1994 De Jong et al. ................. 355/326 R
5,473,421 * 12/1995 Maruyama et al. .................. 399/39
5,493,385 * 2/1996 Ng .......................................... 399/40
5,497,225 * 3/1996 Matsuzuki ............................ 399/223
5,950,051 * 9/1999 Casella ................................ 399/164

FOREIGN PATENT DOCUMENTS 08-137153 * 5/1996 (JP) .

* cited by examiner

*Primary Examiner*—Robert Beatty
(74) *Attorney, Agent, or Firm*—Perman & Green, LLP

(57) ABSTRACT

A color printer has imaging stations disposed along a photoreceptor belt for producing images on the belt, the belt passing around an idler roll. One or more of the imaging stations is disposed on one side of the idler roll and a plurality of the imaging stations is disposed on an opposite side of the idler roll. A belt driver drives the photoreceptor belt around the idler roll and past the imaging stations. The printer includes a system for compensating for eccentricity in the idler roll to preserve registration among the images of the respective imaging stations, the system including a particular spacing of the imaging stations, a sensor of an index of the idler roll, and a corrector responsive to a position of the index for outputting an eccentricity correction to the belt driver. The correction alters the location on the belt of the image of the one or more imaging stations on the one side of the idler roll to compensate for the eccentricity by altering the speed of the belt or timing of the image scanning within each of the one or more imaging stations. Values of the correction are synchronized with the location of an index on the idler wheel.

17 Claims, 2 Drawing Sheets

PRINTER COLOR REGISTRATION BY COMPENSATION FOR ECCENTRICITY IN IDLER ROLL

BACKGROUND OF THE INVENTION

This invention relates to multiple-color printers wherein imaging stations are disposed along an image receptor belt and, more particularly, to compensation for a disturbance of image registration induced by eccentricity of an idler roll disposed between two of the imaging stations.

One form of multiple-color printers employs a sequence of imaging stations disposed along a common span of an image receptor belt. By way of example, the belt may be carried by rolls wherein one of the rolls is a drive roll, a second of the rolls is a tension roll, and a third of the rolls is an idler roll. In the construction of such printers, it is important to maintain registration among the various color separations of the final image, which color separations are provided by the respective ones of the imaging stations. Construction of such printers is disclosed in United States Patents: Rees et al. U.S. Pat. Nos. 5,229,787; Dastin et al. 5,287,160; and de Jong et al. 5,287,162. In Dastin et al., placing all imaging stations at a distance from each other equal to an integer multiple of all component perimeters causes the cyclic error in velocity at each imager to be equal and in-phase, thereby eliminating the relative registration error. In the case of an image device such as a raster output scanner (ROS), the ROS synchronization and writing time might lead to errors in registration. These errors may be corrected by use of the mark-on-belt (MOB) sensor as taught by de Jong et al. Therein, the relative locations of different color chevron-shaped marks produced by each of the imagers is measured by the MOB sensor to enable corrective timing.

Practical rolls have significant eccentricity and cause the photoreceptor belt to have a cyclic error component in its velocity. The wavelength of this motion disturbance is too long to produce a perceptible single-color visual effect known as banding. However, unless the photoreceptor belt has the identical in-phase error at each imager, the various color separations do not overlap exactly. Such registration errors will cause shifts in hue, which may also appear in regular patterns known as rainbow banding. These effects are deleterious to image quality.

An aspect in the construction of the printers of the prior art is the locating of the successive imaging stations along a single span of the belt. Such a construction is useful in attaining a high degree of registration among the component images produced by the respective imaging stations. A disadvantage of such construction is the relatively large size of such a printer, the large size being due to the linear array of the in stations along the single span of the belt. In order to reduce the physical size of the printer, it is advantageous to locate the imaging stations on more than one span of the image receptor belt. With such a construction, an idler roll would be located between two of the imaging stations.

A problem arises with a construction wherein the idler roll is located between two of the imaging stations, this problem arising from a relatively small eccentricity within the idler roll. Such eccentricity may be characterized, in part, by a bump or portion of the idler roll with enlarged radius. As the bump engages with the belt, the speed of the belt upstream of the roll is increased momentarily while the consequent geometric alteration in the belt is taken up by the tension roll. As a result, the location of the image produced by an imaging station, located on the opposite side of the roll, is displaced slightly on the belt. In high-quality imaging, displacement of component images on the order of microns produces a noticeable effect on the final image. Therefore, there is a need to provide some form of compensation for the eccentricity of the idler roll.

SUMMARY OF THE INVENTION

The aforementioned problems are overcome and other advantages are provided by a system and method which compensate for eccentricity in an idler roll of a multiple-color printer, and thereby preserve registration among the images of the various imaging stations. While the invention has applicability generally to conveyor systems wherein there is an eccentric element disturbing registration among workstations located at opposite sides of an idler roll, the invention is particularly applicable and advantageous to the case of the multiple-color printer having imaging stations disposed along a photoreceptor belt for producing images on the belt, and wherein the belt passes around an idler roll. In an embodiment of the invention wherein the physical size of the multiple-color printer is reduced, one or more of the imaging stations is disposed on one side of the idler roll, for example the right-hand side, and a plurality of the imaging stations is disposed on the opposite side of the idler roll. Also included within the printer is a belt driver which drives the photoreceptor belt around the idler roll and past the imaging stations.

In accordance with the invention, compensation for eccentricity in the idler roll to preserve registration among the images of the imaging stations is accomplished, in accordance with one embodiment of the invention, by providing a correction to the driver to alter the speed of the belt by an amount which counteracts the effects of the apparent shift in speed of the belt observed at the one or more right-hand imaging stations. Alternatively, in accordance with further embodiment of the invention, the correction is applied to the timing circuitry which drives a laser scanner or LED (light emitting diode) imaging array within each of the one or more right-hand imaging stations, such that the times of occurrence of the respective scans are altered to compensate for the apparent shift in the speed of the belt. Such compensation must be synchronized with rotation of the idler roll. Accordingly, the idler roll is provided with an index which is sensed by a sensor, the sensing of the index establishing a once-per-revolution synchronization signal by which a pattern of speed alteration is synchronized with the rotation of the idler roll.

Each of the imaging stations provides for identification marks on the belt. Measurement circuitry is provided for measuring spacing along the belt between the identification marks of the right-hand imaging stations and one of the plurality of imaging stations, and for establishing an error in their spacing. The measurement circuitry also computes a corresponding error in belt speed, the latter being used for computing the correction. The error varies with rotation of the idler roll and, accordingly, a succession of values of error are obtained for successive positions along the belt corresponding to successive rotational positions of the idler roll. There is a corresponding functional relationship of the correction function to rotational position of the idler roll. A succession of values of the correction function is stored in a memory addressed with a sequence of address values starting with the occurrence of the index of the idler roll. Therefore, by the aforementioned sensing of the idler roll index, the memory outputs the requisite sequence of values of correction function to alter the speed of the belt, in the first embodiment of the invention, or the timing of the scanning in the second embodiment of the invention. A phase-locked loop may be employed for synchronizing the addressing of the memory with the occurrences of the index.

BRIEF DESCRIPTION OF THE DRAWING

The aforementioned aspects and other features of the invention are explained in the following description, taken in connection with the accompanying drawing figures. wherein.

Identically labeled elements appearing in different ones of the figures refer to the same element but may not be referenced in the description for all figures.

DETAILED DESCRIPTION OF THE INVENTION

Figure 1:
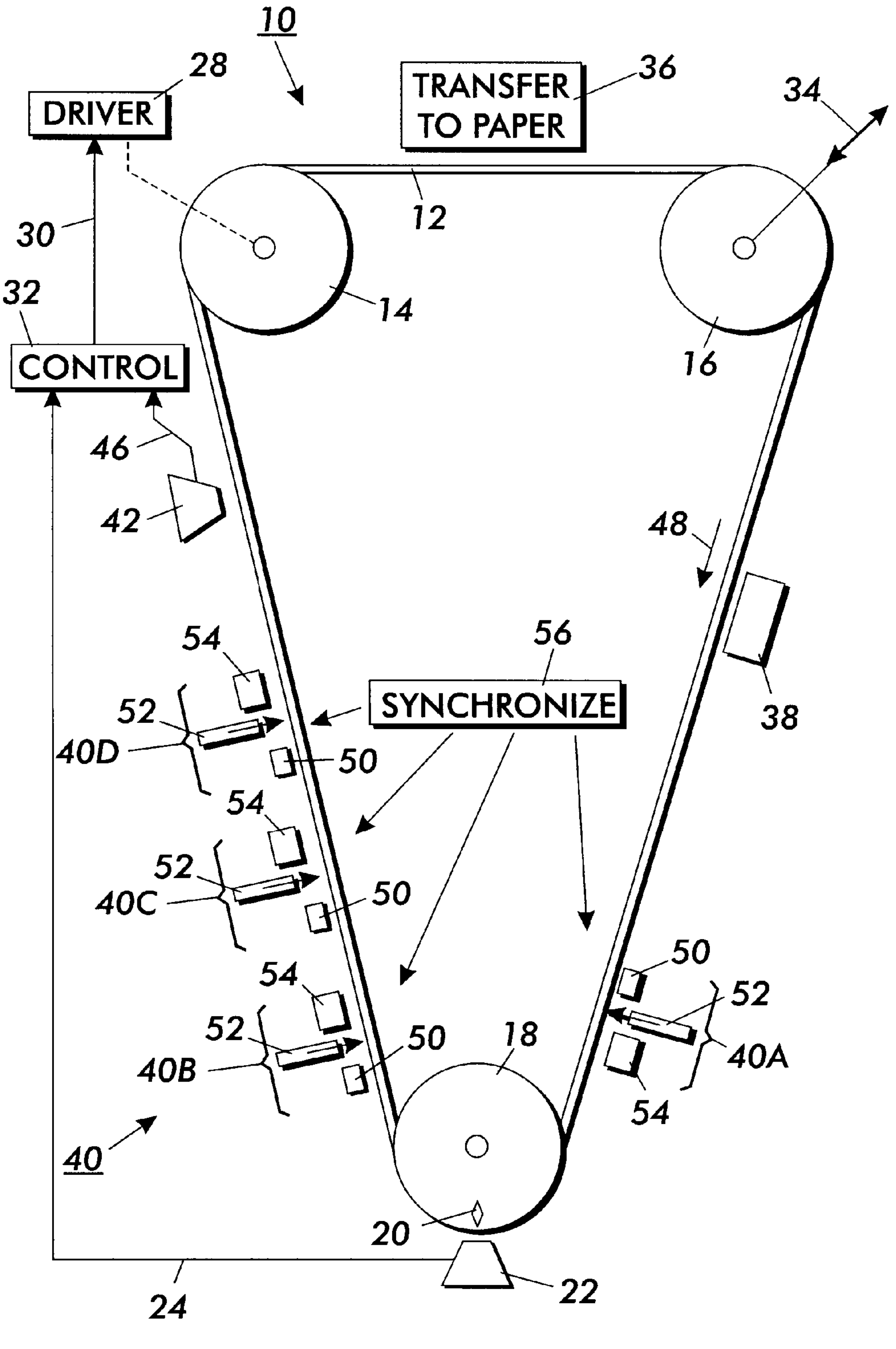
FIG. 1 shows diagrammatically a multiple-color imaging system including compensation for eccentricity in an idler carrying a photoreceptor belt, in accordance with the invention.

With reference to FIG. 1, a multiple-color printer 10 comprises a photoreceptor belt 12 carried on three rolls, namely, a drive roll 14, a tension roll 16, and an idler roll 18 which may serve also a steering roll. The idler roll 18 is provided with an index 20, and a sensor 22 of the index outputs an electric signal on line 24 to signal the rotational position of the idler roll 18 during rotation of the roll 18. The index sensor 22 may operate optically or magnetically such as a Hall-effect sensor or an induction sensor. The drive roll 14 is connected mechanically, indicated by dashed line 26, to a driver 28 which imparts rotation to the drive roll 14 in response to an electric signal received via line 30 from a controller 32. Rotation of the drive roll 14 imparts linear motion to the belt 12 as the belt 12 moves with continuous motion about the three rolls 14, 16 and 18. The tension roll 16 is supported on a spring-loaded mechanical mount, indicated at 34, for maintaining a desired tension in the belt 12 upon rotation of the belt 12 about the three rolls 14, 16 and 18.

The printer 10 further comprises a transfer station 36, a belt cleaner 38 and four imaging stations 40. To facilitate discussion of the four imaging stations 40, the imaging stations 40 are further identified by the legends A, B, C and D. The belt 12 has three spans, namely, a top span along which is placed the transfer station 36, a right span along which are placed the belt cleaner 38 and one imaging station 40A, and a left span along which are placed three imaging stations 40B, 40C and 40D, and a mark-on-belt (MOB) sensor 42. The terms "right" and "left" are used hereinafter for convenience with reference to the arrangement of the components of the printer 10 as shown in FIG. 1, and not by way of limitation, it being understood that the arrangement of the components of the printer 10 could be reversed if desired in the construction of the printer 10. The MOB sensor 42 outputs electrical signals via line 46 to the controller 32. The belt 12 moves in clockwise direction as is indicated by the arrow 48. Each of the imaging stations 40 comprises a charger 50, an imager 52, and a developer 54. In the operation of each of the imaging stations 40, the charger 50 charges the photoreceptor material on the belt 12, this is followed by production of an image on the belt 12 by means of a scanning laser beam of the imager 52, this being followed by application of toner upon the image by the developer 54. Synchronization of the operation of the various components of the printer 10 is accomplished by means of timing signals provided by a synchronizer 56 to these components.

To facilitate discussion of the four imaging stations 40, the imaging stations 40 are further identified by the legends A, B, C and D. The imaging stations 40 have similar construction, but differ in the toner of the respective developers 54 so as to provide for respective color components of a final image, the final image being extracted from the belt 12 at the transfer station 36 to be presented, by way of example, as hard copy on paper. Each of the imaging stations 40 also imprints marks on the belt 12, the locations of the respective marks on the belt 12 serving to identify individual ones of the respective imaging stations 40. The presence of each of the identification marks (to be described in further detail in FIG. 2) is detected by the MOB sensor 42, the detections of the respective ones of the identification marks being converted by the sensor 42 to the electrical signals transmitted via line 46 to the controller 32.

In accordance with a feature of the invention, a reduction in the overall size of the printer 10 is accomplished by placing some of the imaging stations 40 on one of the spans of the belt 12, and at least one of the remaining ones of the imaging stations 40 on a second of the spans of the belt 12. By way of example, as described above in FIG. 1, the first imaging station 40A is located on the right span of the belt 12 while the succeeding three imaging stations 40B–D are located on the left span. By way of further embodiments, additional imaging stations (not shown in the drawing) may be located on the right span of the belt 12. The right and the left spans are separated by the idler roll 18. Ideally, the idler roll 18 is perfectly circular. However, in practice, such an idler roll has some eccentricity, characterized by variation in radius of the roll, which disturbs the movement of the belt 12 differently in the left and the right spans.

To illustrate this point, one may consider the approach of the belt 12 along the right span to the idler roll 18. A decrease in the radius of the roll 18 on the left side of the roll 18 enables the movement of the belt 12 at the left span to introduce an increase in the rotational rate of the roll 18. This produces an increase in the speed of the belt 12 at the right span. The change in the speed is allowed by displacement of the tension roll 16. Since the timing of the operations of the respective imaging stations 40 is maintained in synchronism by the synchronizer 56, a momentary increase in the speed of the belt 12 at the right span alters the location of the image of the imaging station 40A on the belt 12 and, in the case of the generation of the image by successive sweeps of a laser scan, the image may be stretched in the direction of travel of the belt 12. As a result, upon combination of the component images of the respective imaging stations 40, the component images produced by the imaging stations 40B–D are properly in registration with each other while the component image reduced by the imaging station 40A is out of registration with the component images of the imaging stations 40B–D.

Thus, the eccentricity in the idler roll (or steering roll) that separates the two different spans of the photoreceptor belt 12 causes the two spans to have different cyclic disturbances. The right-hand span has a motion disturbance equal to that of the left-hand span plus a disturbance of the same frequency but of different magnitude and phase. The synchronous spacing rules employed in the prior art for a linear array of the imaging stations along a single span of a photoreceptor belt cannot correct the registration errors induced in the arrangement of FIG. 1. One possible solution is to make the intervening (idler) roll to be free from eccentricity. Such a solution is expensive. The invention allows the printer 10 to function with an eccentric idler roll 18, and is operative to correct the failure in registration so as to provide for a composite image at the transfer station 36 wherein all of the component images of the four imaging stations 40 are properly in registration.

The solution provided by the invention for eliminating this error is to measure it and to actively correct it. The MOB sensor 42, in conjunction with circuitry of the controller 32, serve to determine the amplitude and the phase relationship of the cyclic error between the imaging station 40A and any one of the other imaging stations 40B–D located in the left-hand span of the belt 12. The phase of the error must be related to the angular position of the idler roll 18. The angular position can be characterized by the once-per-revolution index 20 of the idler roll 18, as sensed by the index sensor 22. In accordance with a feature of the invention, the error can be measured once and the correction need not be changed unless the idler roll is changed.

After the error is measured, it is corrected. In the event that the imaging station 40A employs a ROS capable of moving the writing line in the process direction (agile ROS), correction for this cyclic error may be corrected by displacement of the writing line. Such a means for correcting cyclic errors is a feature of the invention. Likewise, if the imaging station employs an LED image bar, the error can be corrected by a timing of each line. Also, this correction can be made even with a conventional ROS imager by dynamically altering the ROS speed, beginning of the image scan, and write clock frequency. That is, the speed of the motor polygon of the imaging station 40A is altered in time so that it matches the amplitude, frequency, and phase of the relative speed error. Since the speed of the polygon affects the length of the written data lines, this correction is made simultaneously with a modulation of the data clock frequency and of the delay between start-of-scan and the start of data. This makes the edge of the written page to be straight and the width of the written image to be constant.

Figure 2:
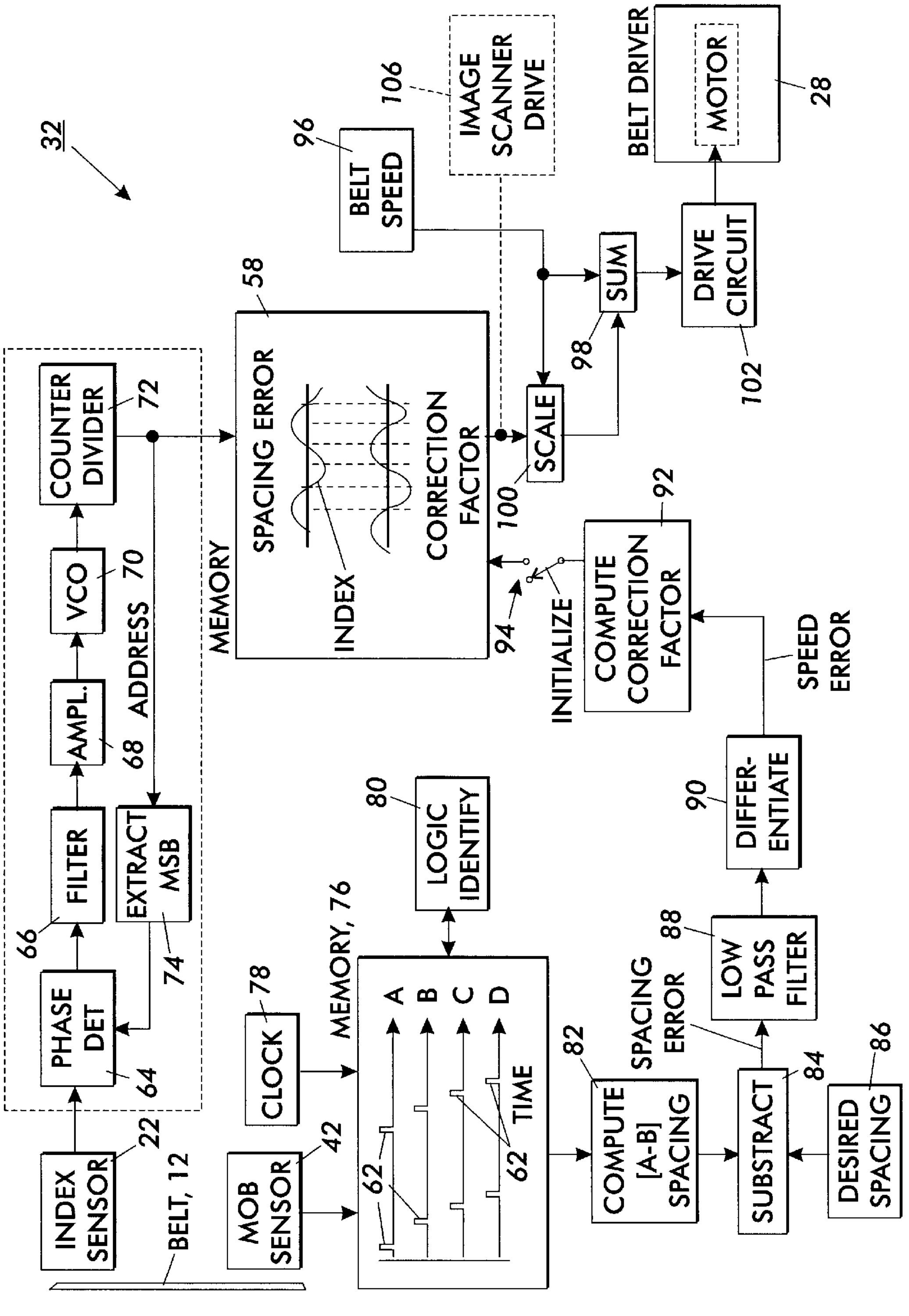
FIG. 2 is a block diagram showing generation of the correction function of the invention to compensate for loss of registration due to the eccentricity of the idler roll.

With reference to FIG. 2, there are shown details in the construction of the controller 32 of FIG. 1 for the processing of signals of the index sensor 22 and the MOB sensor 42 to provide a correction function to compensate for the eccentricity of the idler roll 18. This may be accomplished by correction of the speed of the belt 12, in the right-hand span of the belt 12, or by altering the timing of a ROS of the imaging station 40A in the event that the imaging station 40A be constructed with a ROS. The controller 32 comprises a memory 58 which stores values of the correction function. Addressing of the memory 58 is accomplished by synchronizing operation of the memory 58 with the rotation of the idler roll 18, the synchronization being accomplished by use of a phase locked loop (PLL) 60 which interconnects the index sensor 22 with the memory 58. The correction is generated initially by observation of the times of occurrence of the various identification marks 62 imprinted via the respective ones of the imaging stations 40 on the belt 12. This information is used to obtain the belt speed error from which the appropriate compensatory change in speed of the drive roll 14 is produced.

The PLL 60 comprises a phase detector 64, a low pass filter 66, and amplifier 68, a voltage controlled oscillator (VCO) 70, and a counter 72. During movement of the belt 12, and the corresponding rotation of the idler roll 18, the index sensor 22 outputs a succession of uniformly spaced pulses corresponding to the detections of the index 20 of the rotating roll 18. In the operation of the PLL 60, the VCO 70 outputs a succession of pulses which are counted by the counter 72. The output count of the counter 72 serves as an address for the memory 58. The counter 72 counts modulo the maximum value of the address. The counter 72 serves as a divider in that the maximum significant bit (MSB) of the output count, extracted at 74, serves as a reference signal for operation of the phase detector 64 in detecting the phase of the pulse signal outputted by the index sensor 22 during the movement of the belt 12. The filter 66 and the amplifier 68 establish a bandwidth and a gain for stability of the loop as is well-known in the construction of a PLL. Thereby, the counting of the counter 72, and the generating of the address for the memory 58, are locked to the rotation of the idler roll 18.

The identification marks 62 provided by the MOB sensor 42 are stored in a memory 76 with the aid of timing signals provided by a clock 78. The clock 78 may be part of the synchronizer 56. Storage of the identification marks 62 is portrayed by means of a graph with lines thereof identified by the legends A–D corresponding to the four imaging stations 40A–D. The times of occurrence of the respective ones of the identification marks 62 are provided by the clock 78. It is noted that the times of occurrence of the identification marks 62 of different ones of the imaging stations 40 are offset from each other. Thereby, a logic unit 80 connecting with the memory 76 is able to establish correspondence between the marks 62 and their respective imaging stations 40, thereby to identify the respective marks 62 within the memory 76.

In order to determine the presence of a spacing error on the belt 12 due to the eccentricity of the idler roll 18, the times of occurrence of the identification marks of the imaging station 40A on the right-hand span of the belt 12 are compared to the times of occurrence of the identification marks of another one of the imaging stations 40 on the left-hand span of the belt 12. By way of example, the identification marks of the imaging station 40B are employed for this purpose. To accomplish the mathematical operations of determining the spacing error and the requisite correction, the controller 32 further comprises a computation element 82, a subtractor 84, a reference value 86 of the desired spacing, a low pass filter 88, a differentiator 90, and a computation unit 92.

In the operation of the controller 32 to compute the spacing error and the correction, the computation element 82 extracts the times of occurrence of the corresponding identification marks 62 of the imaging stations 40A and 40B, and forms their difference. The difference in the times of occurrence represents the spacing between the images of the imaging stations 40A and 40B on the belt 12. This difference is compared to the desired spacing of the reference value 86 by means of the subtractor 84 which outputs the difference between the two spacing values. The output of the subtractor 84 is the spacing error. The error is then filtered by the filter 88 to reduce the effect of any noise which may be present in the measurement. The filtered spacing error outputted by the filter 88 is then differentiated at 90 to produce the speed error. The speed error is then applied to the computation unit 92 for computation of the requisite correction function.

By way of example in the construction of the computation unit 92, a read-only memory may be included therein for storing values of the speed increment to be provided by the driver 28 to the drive roll 14 to produce the desired registration between the images of the imaging station 40A and 40B. The values of the speed increment may be obtained experimentally, and then stored in the computation unit 92. It desired, the computation unit 92 may also provide for approximating values of speed increment between the stored values of the speed increment. The values of the speed increment are obtained for a specific known value of the average speed of the belt 12. The computation unit 92 computes the ratio of the speed increment to the average speed to provide the correction function. Upon attainment of the correction function, a switch 94 is closed to couple the correction function from the computation unit 92 into the memory 58, this constituting an initialization of the controller 32. After storage of values of the correction function in the memory 58, the switch 94 and is opened.

During the running on the belt 12 for printing images, the desired belt speed, input at 96, it is applied to both a summer 98 and a scaler 100. Upon the addressing of the memory 58 by the PLL 60, the memory 58 outputs the correction to the scaler 100, the scaler 100 then scaling the value of the belt speed by the correction to provide the requisite increment in the belt speed. The increment in belt speed is then summed with the belt speed by the summer 98 to provide a corrected value of belt speed, the corrected value of belt speed being applied to a drive circuit 102. The drive circuit 102 energizes a motor 100 of the belt driver 28 to rotate the drive roll 14. Thereby, the speed of the belt 12 is altered to compensate for the eccentricity of the idler roll 18 to insure registration among the images of all of the imaging stations 40.

In order for the correction by altering the speed of the drive roll to be effective, the belt length between imaging stations 40A and 40B must be equal to an integer number of perimeters of the roll 18 plus the wrap length of the belt 12 on the roll 18. Also, the spacings between imaging stations 40 on the left span are equal to each other and to an integral multiple of the perimeter of any one of the rolls 14, 16 and 18. This may be expressed alternatively that the perimeter of each of the rolls is an integer submultiple of the distance between adjacent imaging stations 40B–D. For this condition to be met, all of the rolls should be equal in perimeter, or the perimeters should have ratios of integers such as 2:3, 3:4, or 3:1 by way of example. Furthermore, in the situation wherein there are plural imaging stations 40 (not shown in FIG. 1) on the right span of the belt 12, the magnitude of each of the spacings between the imaging stations on the right span is equal to the magnitude of a spacing between successive imaging stations 40 on the left span. Then, the speed correction effectively makes the angular velocity of roll 18 constant. In this condition, the speed disturbance in the right span is identical to the speed disturbance in the left span, but leads it in time by the wrap on the roll. Then the image disturbances will overlap. This condition also allows the correction to be made for different speeds of the belt movement.

In the case of the alternative embodiment of the invention wherein each of the image stations 40 comprises a driver 106 for scanning the image, such as an ROS, the correction may be applied directly from the memory 58 to the scanner drive 106, as indicated in dashed line in FIG. 2. This enables the scanning to the altered so as to bring the image of the imaging station 40A into registration with the image of the imaging station 40B.

In the foregoing description of the invention, each of the workstations located along the belt 12 is shown as an imaging station of a multiple color printer. However, is noted that the principles of the invention can be carried out in the case wherein the workstations perform some function other than that of forming an image and, by way of example, may include workstations which provide a mechanical forming operation wherein the component parts produced by each of the workstations must be held in very accurate alignment to complete a manufacturing process.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A color printer having imaging stations disposed along a photoreceptor belt for producing images on said belt, said belt passing around an idler roll, wherein one or more of said imaging stations is disposed on a right span of said belt extending from a right side of said idler roll and a plurality of said imaging stations is disposed on a left span of said belt extending from a left side of said idler roll, each of said imaging stations including a charger, an imager, and a developer, said printer including a belt driver which drives said photoreceptor belt around said idler roll and past said imaging stations, and wherein said printer also includes a system for compensating for eccentricity in said idler roll to preserve registration among the images of said imaging stations, wherein an eccentricity of said idler roll induces different cyclic disturbances in said right and sold left spans, said system comprising:

a sensor for sensing an index of said idler roll; and a corrector responsive to a position of said index for outputting an eccentricity correction function altering the location on said belt of the image of one of said imaging stations on said right span relative to the images of said plural imaging stations on said left span to compensate for said eccentricity, the correction function being applied to said belt driver and being operative to alter a speed of said belt to compensate for a differential speed between said right span and said left span of the belt, thereby to accomplish said altering of the location of the image of said one imaging station.

2. A printer according to claim 1 wherein said belt passes around a tension roll, said left span of said belt extends from said idler roll to a roll of said belt driver and said right span of said belt extends from said idler roll to said tension roll, and the length of said belt between the imaging station nearest said idler roll on the right span and the imaging station nearest said idler roll on the left span is equal to an integer number of perimeters of said idler roll, plus the wrap length on said idler roll.

3. A printer according to claim 2 wherein the perimeters of respective ones of the rolls are equal.

4. A printer according to claim 2 wherein the perimeters of respective ones of the rolls are related by ratios of integers.

5. A printer according to claim 4 wherein there is a plurality of said imaging stations on said right span of said belt, and the spacing between successive ones of the imaging stations on said right span of said belt is equal to an integral number of any one of said rolls.

6. A printer according to claim 5 wherein there is a plurality of said imaging stations on said right span of said belt, and the spacing between successive ones of the imaging stations on said right span of said belt is equal to the spacing between successive ones of the imaging stations on said left span of said belt.

7. A printer according to claim 4 wherein the spacing between successive ones of the imaging stations on said left span of said belt is equal to an integer number of perimeters of any one of said rolls.

8. A printer according to claim 1 wherein said correction function is applied to said one imaging station, and is operative to alter a timing of a scanning within said one imaging station to accomplish said altering of the location of the image of said one imaging station.

9. A printer according to claim 1 wherein each of said imaging stations provides identification marks on said belt, said printer further comprising means for measuring a spacing along said belt between the identification marks of said one imaging station and one of said plurality of imaging stations, said measuring means including means for establishing an error in said spacing and a corresponding error in belt speed, said printer further comprising means for computing the correction function from said error in belt speed.

10. A printer according to claim 9 wherein said corrector includes a memory for storing values of said correction function as a function of the rotational position of said idler roll.

11. A printer according to claim 10 further comprising a loop circuit for locking an address of said memory to a sensing of said index by said sensor.

12. A method for operation of a color printer having imaging stations disposed along a photoreceptor belt for producing images on said belt, said belt passing around an idler roll, wherein one or more of said imaging stations is disposed on a first span of said belt on one side of said idler roll and a plurality of said imaging stations is disposed on a second span of said belt on an opposite side of said idler roll, each of said imaging stations including a charger, an imager, and a developer, and wherein the printer includes a belt driver which drives said photoreceptor belt around said idler roll and past said imaging stations, the method providing compensation for eccentricity in said idler roll to preserve registration among the images of said imaging stations, wherein an eccentricity of said idler roll induces different cyclic disturbances in the first and the second spans of said belt on the opposite sides of said idler roll, the method comprising steps of:

- sensing the position of an index of said idler roll;
- providing a set of values of an eccentricity correction function as a function of angle of rotation of said idler roll; and
- in response to a sensed position of said index, outputting values of said eccentricity correction function for altering the location on said belt of the image of sold one imaging station on said first span relative to the images of said plural imaging stations on said second span to compensate for said eccentricity, the method including a step of applying the correction function to said belt driver to alter a speed of said belt to compensate for a differential speed between said first span and said second span of the belt, thereby to accomplish said altering of the location of the image of said one imaging station.

13. A method according to claim 12 wherein said correction function is outputted to said one imaging station and is operative to alter a the timing of a scanning within said one imaging station to accomplish said altering of the location of the image of said one imaging station.

14. A method according to claim 12 wherein each of said imaging stations provides an identification marks on said belt, the method further comprising steps of measuring a spacing along said belt between the identification marks of said one imaging station and one of said plurality of imaging stations, and establishing an error in said spacing and a corresponding error in belt speed, there being a further step of computing the correction function from said error in belt speed.

15. A method according to claim 14 further comprising a step of storing values of said correction function as a function of distance along said belt.

16. A method according to claim 15 further comprising a step of locking an address of said memory to a sensing of said index by said sensor.

17. A conveyor apparatus comprising work stations disposed along a conveyor for providing objects on said conveyor, said conveyor passing around an idler roll, wherein at least one of said stations is disposed on a first span of said conveyor on one side of said idler roll and a plurality of said stations is disposed on a second span of said conveyor on an opposite side of said idler roll, said apparatus including a system for compensating for eccentricity in said idler roll to preserve registration among the objects of said stations, wherein an eccentricity of said idler roll induces different cyclic disturbances in said conveyor on opposite sides of said idler roll, said system comprising:

- a sensor for sensing an index of said idler roll;
- a conveyor driver which drives said conveyor around said idler roll and past said stations; and
- a corrector responsive to a position of said idler roll relative to its index for outputting an eccentricity correction function for altering the location on said conveyor of the object of said one station on said first span relative to the objects of said plural stations on said second span to compensate for said eccentricity, the correction function being applied to said conveyor driver and being operative to alter a speed of said conveyor to compensate for a differential speed between said first span and said second span of the conveyor, thereby to accomplish said altering of the location on said conveyor of the object of said one station.

* * * * *